United States Patent
Yoshida et al.

[11] Patent Number: 5,847,488
[45] Date of Patent: Dec. 8, 1998

[54] APPARATUS HAVING DRIVE DEVICE USING ELECTROMECHANICAL TRANSDUCER

[75] Inventors: Ryuichi Yoshida, Sagamihara; Yasuhiro Okamoto, Tondabayashi, both of Japan

[73] Assignee: Minolta Co., Ltd., Osaka, Japan

[21] Appl. No.: 796,649

[22] Filed: Mar. 4, 1997

[30] Foreign Application Priority Data

Mar. 6, 1996 [JP] Japan ................................. 8-075443

[51] Int. Cl.⁶ .............................. H02N 2/04; H01L 41/04
[52] U.S. Cl. ......................... 310/328; 310/344; 310/341; 310/340
[58] Field of Search ................................. 310/328, 344, 310/340, 341, 323

[56] References Cited

U.S. PATENT DOCUMENTS

| | | | |
|---|---|---|---|
| 4,195,243 | 3/1980 | Thaxter | 310/317 |
| 4,947,077 | 8/1990 | Murata | 310/328 |
| 5,089,708 | 2/1992 | Asselbergs | 250/442.11 |
| 5,164,974 | 11/1992 | Kariya et al. | 378/34 |
| 5,225,941 | 7/1993 | Saito et al. | 359/824 |
| 5,589,723 | 12/1996 | Yoshida et al. | 310/328 |

*Primary Examiner*—Clayton LaBalle
*Assistant Examiner*—Timothy A. Williams
*Attorney, Agent, or Firm*—McDermott, Will & Emery

[57] ABSTRACT

An apparatus having a drive device using an electromechanical transducer capable of being used in an environment in vacuum, at high temperatures and shielded from outside, an environment where electromagnetic waves are shielded or the like, where a drive shaft and a slider block frictionally coupled thereto are arranged at the inside of a hermetically-sealed vessel, one end of a drive shaft is made to penetrate a wall face portion of the hermetically-sealed vessel and the drive shaft is coupled with a piezoelectric element arranged at the outside of the vessel, the wall face portion of the hermetically-sealed vessel where the drive shaft penetrates is made elastically deformable, a portion between the wall face portion and the drive shaft is shielded in airtight by an adhesive agent and elongation and contraction displacements having different velocities are caused at the piezoelectric element whereby the slider block frictionally coupled with the drive shaft and members fixed to the slider block at the inside of the hermetically-sealed vessel are moved in a predetermined direction.

14 Claims, 9 Drawing Sheets

PRIOR ART    Fig. 13
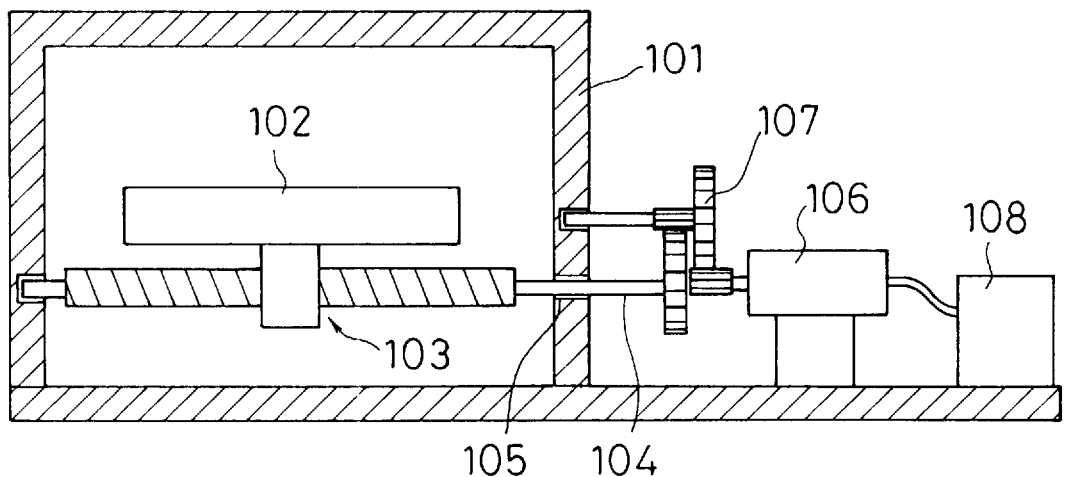
PRIOR ART    Fig. 14
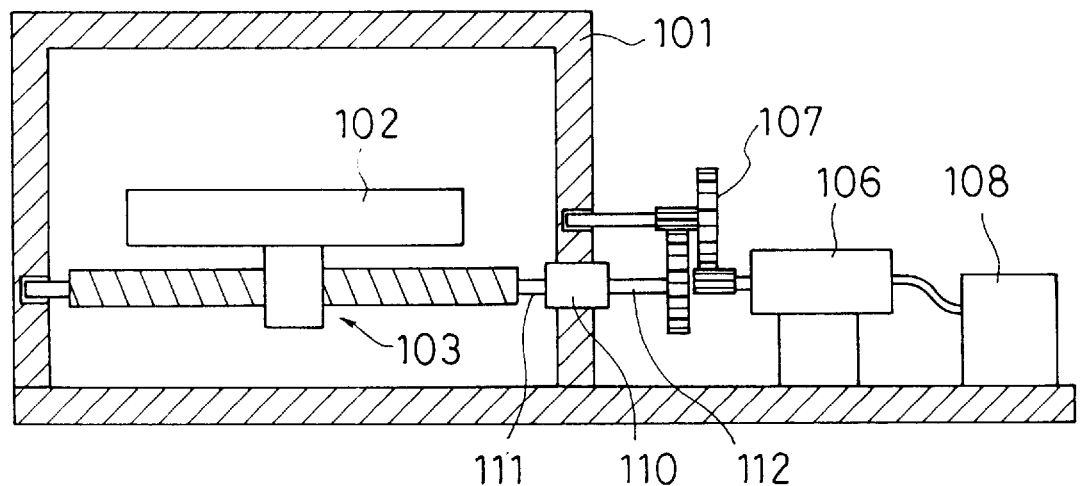

APPARATUS HAVING DRIVE DEVICE USING ELECTROMECHANICAL TRANSDUCER

BACKGROUND OF THE INVENTION

1. Field of the Invention

The present invention relates to an apparatus having a drive device using an electromechanical transducer suitable for using under special environments, particularly to apparatuses of a surface condition measuring apparatus such as an electron microscope, an AFM (Atomic Force Microscope), an STM (Scanning Tunnel electron Microscope) or the like, and etching apparatus and so on. Incidentally, an AFM is a microscope knowing a shape of a sample by utilizing Van der Waals' force operating among atoms and detecting a change in a force operating between a sample and a probe.

2. Description of the Prior Art

For example, as illustrated by FIG. 13 according to a sample stage drive device in an electron microscope, a sample stage 102 and a ball screw mechanism 103 for moving the sample stage 102 are installed inside of a hermetically-sealed vessel 101, a drive shaft 104 of the ball screw mechanism 103 is extended outwardly from a hole 105 provided at the hermetically-sealed vessel 101 and the drive shaft 104 is driven by a drive mechanism constituted by a motor 106 and a reduction gear mechanism 107 provided outside of the hermetically-sealed vessel. Incidentally, numeral 108 designates a motor power source.

According to the structure illustrated by FIG. 13, the airtightness of the hermetically-sealed vessel 101 is difficult to maintain sufficiently since the hole 105 needs to be provided at the hermetically-sealed vessel 101 in order to extend outwardly the drive shaft 104. Therefore, as illustrated by FIG. 14, a coupling mechanism 110 is installed to the hermetically-sealed vessel 101 whereby a drive shaft 111 inside of the hermetically-sealed vessel 101 is coupled with a drive shaft 112 of the drive mechanism 107 installed outside of the hermetically-sealed vessel 101 via the coupling mechanism 110. As the coupling mechanism, a mechanical coupling mechanism provided with an airtight seal arranged between the drive shaft and the hermetically-sealed vessel, a magnetic coupling mechanism for magnetically coupling the drive shafts on the both sides arranged via a partition by magnetic disks, or the like is known.

In addition thereto, as illustrated by FIG. 15, there has been proposed a constitution where all of the sample stage 102, the ball screw mechanism 103, the motor 106 and the drive mechanism 107 are arranged inside of the hermetically-sealed vessel 101.

Among the constitutions of the drive devices explained as described above, there is a drawback in the constitution as illustrated by FIG. 13 where the airtightness of the hermetically-sealed vessel cannot be sufficiently maintained. Further, according to the constitution illustrated by FIG. 14, the airtightness of the hermetically-sealed vessel may not be maintained sufficiently depending on the constitution of the coupling mechanism and further, if the coupling mechanism capable of sufficiently maintaining the airtightness is used, the mechanism gives rise to a high cost.

According to the constitution illustrated by FIG. 15, if the environment inside of the hermetically-sealed vessel is hostile, for example, a corrosive gas is contained or the environment is under high temperatures, or the like, the drive mechanism is failed. Furthermore, when the inside of the hermetically-sealed vessel is intended to maintain in high vacuum, a lubricant used in the drive mechanism is volatized, or the like, and although the drive mechanism dealing with the volatization of the lubricant is known, the mechanism has a drawback of a high cost. Also, when an electric motor such as a DC (Direct Current) motor, a stepping motor, a linear motor or the like is used as a power source of the drive mechanism, if it is applied to an electron beam apparatus sensitive to an influence from a magnetic field, such as an electron microscope, the surrounding of the electric motor that is a source of generating the magnetic field needs to be magnetically shielded sufficiently, which gives rise to a significantly high cost.

SUMMARY OF THE INVENTION

It is an object of the present invention to resolve the problems of the conventional drive devices for moving a sample stage or the like inside of a hermetically-sealed vessel, or apparatuses such as an electron microscope or the like having such driving devices and to provide a drive device or an apparatus using an electromechanical transducer that is easy to handle.

According to one aspect of the present invention, there is provided an apparatus having a drive device using an electromechanical transducer including a base frame, an electromechanical transducer one end of which is fixed to the base frame, a driving member one end of which is fixed to the electromechanical transducer and which is supported movably in a direction of a displacement caused in the electromechanical transducer, a moving member frictionally coupled with the driving member and a driver for driving the electromechanical transducer to cause reciprocal displacements having different velocities wherein the driving member is reciprocally displaced based on the reciprocal displacements having the different velocities caused in the electromechanical transducer whereby the moving member frictionally coupled with the driving member is moved in a predetermined direction, and wherein at least the moving member is arranged in an environment shielded from an outer portion in respect of the environment.

Further, the environments shielded from the outer portion are an environment under a reduced pressure, an environment under high temperatures, an environment where electromagnetic waves influencing on an electron beam or the like and so on.

According to another aspect of the present invention, there is provided an apparatus having a drive device using an electromechanical transducer including a base frame, an electromechanical transducer one end of which is fixed to the base frame, a driving member one end of which is fixed to the electromechanical transducer and which is supported movably in a direction of a displacement caused in the electromechanical transducer, a moving member frictionally coupled with the driving member and a driver for driving the electromechanical transducer to cause reciprocal displacements having different velocities wherein the driving member is reciprocally displaced based on the reciprocal displacements having the different velocities caused in the electromechanical transducer whereby the moving member frictionally coupled with the driving member is moved in a predetermined direction, further including a hermetically-sealed vessel where at least the moving member is arranged, and wherein the moving member arranged in an inner portion of the hermetically-sealed vessel is driven in the predetermined direction via the electromechanical transducer arranged at an outer portion in respect of the hermetically-sealed vessel and the driving member extended to an inner portion of the hermetically-sealed vessel by penetrating the hermetically-sealed vessel.

According to a further aspect of the present invention, there is provided an apparatus having a drive device using an electromechanical transducer including a base frame, an electromechanical transducer one end of which is fixed to the base frame, a driving member moved in a direction of a displacement of the electromechanical transducer when the displacement caused in the electromechanical transducer is transmitted to the driving member, a moving member frictionally coupled with the driving member and a driver for driving the electromechanical transducer to cause reciprocal displacements having different velocities wherein the driving member is reciprocally displaced based on the reciprocal displacements having the different velocities caused in the electromechanical transducer whereby the moving member frictionally coupled with the driving member is moved in a predetermined direction, further including a hermetically-sealed vessel where at least the moving member is arranged and a displacement transmission means provided at a wall face of the hermetically-sealed vessel for transmitting the reciprocal displacements caused in the electromechanical transducer arranged at an outer portion in respect of the hermetically-sealed vessel to the driving member at an inner portion of the hermetically-sealed vessel, and wherein the driving member drives the moving member at the inner portion of the hermetically-sealed vessel in the predetermined direction based on the reciprocal displacements of the electromechanical transducer transmitted to the driving member at the inner portion of the hermetically-sealed vessel via the displacement transmission means.

According to a still further aspect of the present invention, there is provided an apparatus having a drive device using an electromechanical transducer including a base frame, an electromechanical transducer one end of which is fixed to the base frame, a driving member one end of which is fixed to the electromechanical transducer and which is supported movably in a direction of a displacement caused in the electromechanical transducer, a moving member frictionally coupled with the driving member and a driver for driving the electromechanical transducer to cause reciprocal displacements having different velocities wherein the driving member is reciprocally displaced based on the reciprocal displacements having the different velocities caused in the electromechanical transducer whereby the moving member frictionally coupled with the driving member is moved in a predetermined direction, and wherein the electromechanical transducer, the driving member and the moving member are arranged in an environment shielded from an outer portion in respect of the environment.

Other objects of the present invention will be clarified by a detailed description in reference to the attached drawings.

BRIEF DESCRIPTION OF THE DRAWINGS

FIG. 13 is a sectional view showing a first conventional example of a sample stage drive device;

FIG. 14 is a sectional view showing a second conventional example of a sample stage drive device.

DETAILED DESCRIPTION OF THE PREFERRED EMBODIMENTS

An explanation will be given of embodiments of the present invention as follows.

Figure 1:
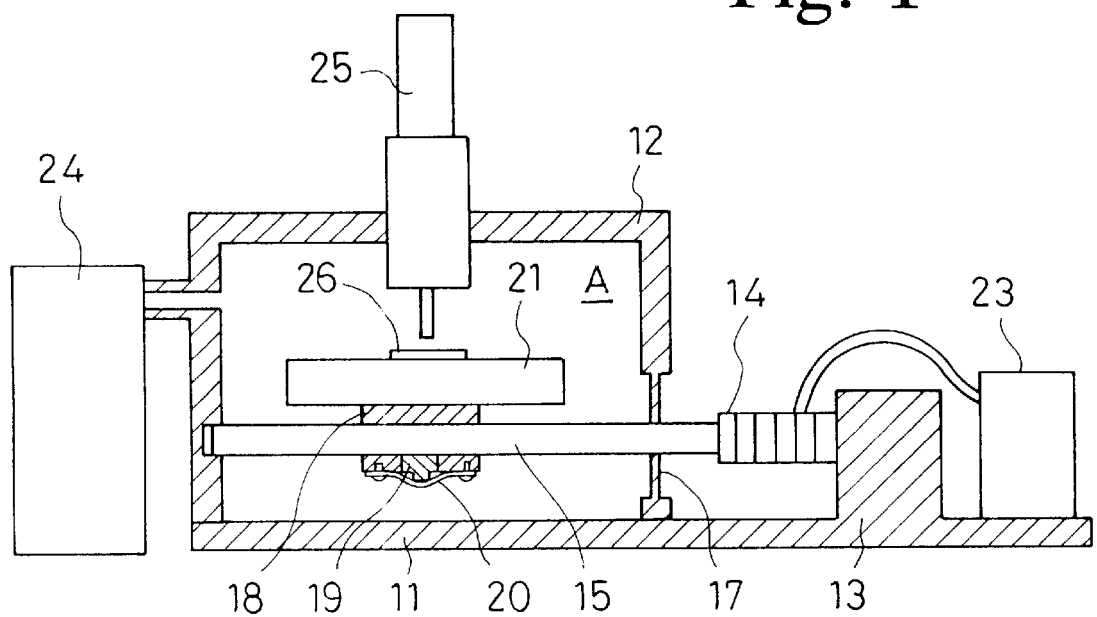
FIG. 1 is a sectional view showing essential portions of an electron microscope according to a first embodiment of the present invention.

FIG. 1 is a sectional view showing an outline structure of an electron microscope according to a first embodiment. In FIG. 1, numeral 24 designates a vacuum pump, numeral 25 designates an electron microscope and numeral 26 designates a sample.

Figure 2:
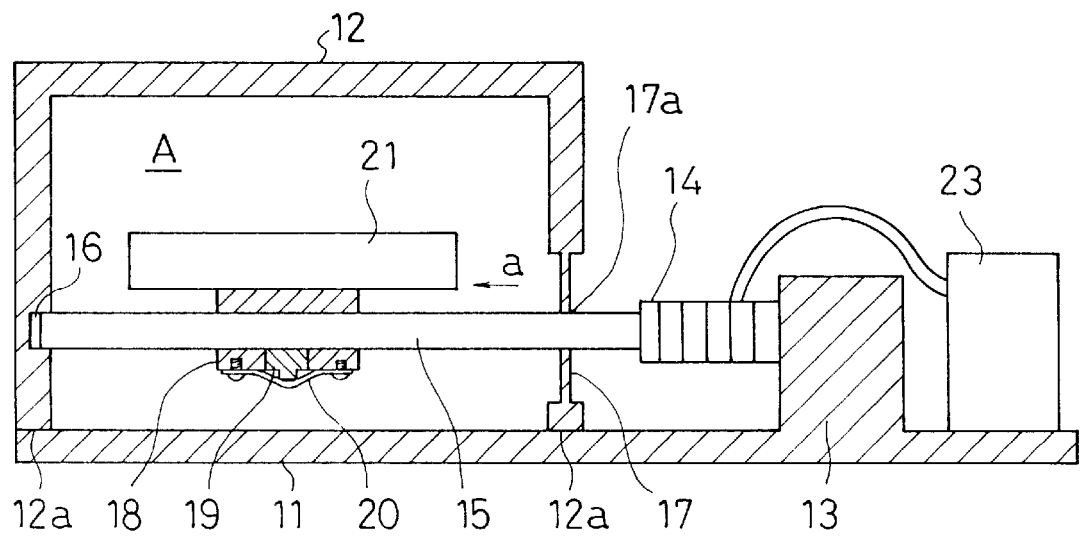
FIG. 2 is a sectional view showing the constitutions of a sample stage and a drive device of the electron microscope illustrated by FIG. 1.

FIG. 2 is a sectional view of a drive device using an electromechanical transducer for driving a sample stage in a hermetically-sealed vessel, which is an essential portion of the first embodiment. In FIGS. 1 and 2, a box 12 is arranged on a frame 11 and the frame 11 and the box 12 are tightly connected at portions 12a by a suitable means of adhesion or the like whereby a hermetically-sealed vessel A is formed.

The hermetically-sealed vessel A is constructed of a material not only for maintaining in airtight the inside thereof from the outside thereof but for shielding electromagnetic waves influencing on the electron beam of the electron microscope.

A supporting member 13 is formed on the frame 11 and one end portion of a piezoelectric element 14 is fixedly adhered to a side face of the supporting member 13. Numeral 15 designates a drive shaft which penetrates a thin wall portion 17 of the box 12, one end of which is fixedly adhered to an end portion of the piezoelectric element 14 and the other end thereof is fitted to and supported by a bearing 16 installed to the inside of the box 12.

The bearing 16 is constituted to permit the displacement of the drive shaft 15 in the axial direction. Further, the thin wall portion 17 where the drive shaft 15 of the box 12 penetrates, is an elastically deformable circular thin wall portion centering on a portion thereof where the drive shaft 15 penetrates and the drive shaft 15 and the thin wall portion 17 are fixedly adhered at a portion 17a thereof by an adhesive agent in order to maintain the airtightness.

Under such a constitution, when a displacement in the thickness direction of the piezoelectric element 14 is caused by driving the piezoelectric element 14, the displacement of the drive shaft 15 in the axial direction is permittable and the airtightness of the hermetically-sealed vessel A can be maintained.

Figure 3:
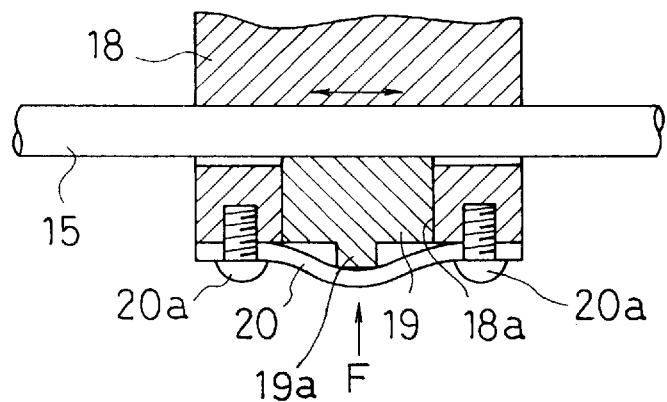
FIG. 3 is an enlarged sectional view of a frictionally-coupled portion of the device shown by FIG. 2.

The drive shaft 15 penetrates a slider block 18 in the horizontal direction, an opening portion 18a is formed below a portion thereof where the drive shaft 15 penetrates whereby a lower half portion of the drive shaft 15 is exposed. FIG. 3 is a sectional view showing the constitution of a frictionally-coupled portion of the slider block 18 including a pad 19 and the drive shaft 15. As shown by FIG. 3, the pad 19 is inserted into the opening portion 18a by which the pad 19 is brought into contact with the lower half of the drive shaft 15, a projection 19a is provided at the lower portion of the pad 19, the projection 19a of the pad 19 is pressed up by a flat spring 20 and an upward urging force F is applied on the pad 19 at a portion thereof that is brought into contact with the drive shaft 15. Incidentally, notation 20a designates screws for fixing the flat spring 20 to the slider block 18 and the urging force F can be adjusted by adjusting an amount of turning of the screws 20a.

By this constitution the slider block 18 including the pad 19 and the drive shaft 15 are brought into press contact with each other by the urging force F of the flat spring 20 whereby the both are frictionally coupled by a pertinent frictional force.

Numeral 21 designates a sample stage fixed onto the slider block 18 by a suitable fixing means such as screws etc. and numeral 23 designates a power supply for driving the piezoelectric element 14.

Figure 4:
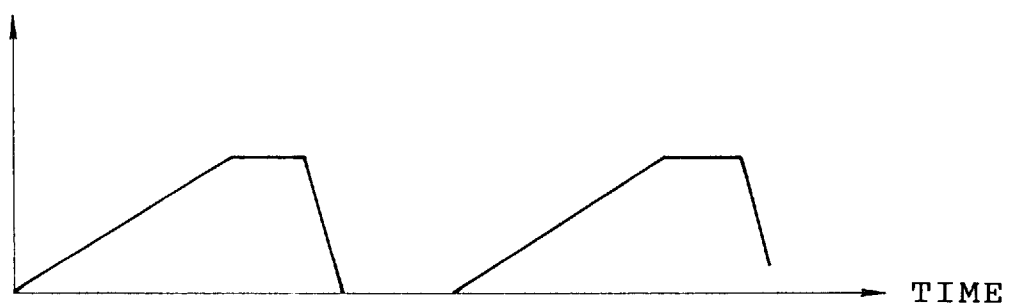
FIG. 4 is a diagram showing an example of waveforms of drive pluses applied on a piezoelectric element.

Next, an explanation will be given of the operation. Firstly, when sawtooth wave drive pulses each having a gradual rising portion and a steep falling portion as shown by FIG. 4 are applied on a piezoelectric element 14, the piezoelectric element 14 is displaced to expand gradually in the thickness direction at the gradually rising portion of each of the drive pulses and the drive shaft 15 coupled to the piezoelectric element 14 is gradually displaced in the positive direction (arrow mark "a" direction). At this moment the slider block 18 frictionally coupled with the drive shaft 15 is moved in the positive direction along with the drive shaft 15 by a frictional coupling force.

At the steep falling portion of each of the drive pulses, the piezoelectric element 14 is rapidly displaced to contract in the thickness direction and also the drive shaft 15 coupled with the piezoelectric element 14 is rapidly displaced in the negative direction (a direction opposed to the arrow mark "a"). At this moment, the slider block 18 frictionally coupled with the drive shaft 15, stays substantially at the position by surpassing the frictional coupling force by the inertia thereof and is not moved. By continuously applying the drive pulses to the piezoelectric element 14, the slider block 18 and the sample stage 21 fixed thereto can be moved continuously in the positive direction.

Incidentally, according to the expression "substantially" mentioned here, there is included a movement of the slider block 18 where the slider block 18 follows the drive shaft 15 while slipping at frictionally coupled faces of the slider block 18 and the drive shaft 15 in any of the positive direction and the direction opposed thereto and the slider block 18 is moved in an arrow mark "a" direction as a whole by a difference in drive time periods.

Movements of the slider block 18 and the sample stage 21 fixed thereto in the negative direction (a direction opposed to the arrow mark "a"), can be achieved by changing the waveforms of the sawtooth wave drive pluses applied on the piezoelectric element 14 and applying the drive pulses each comprising a steep rising portion and a gradual falling portion.

Figure 5:
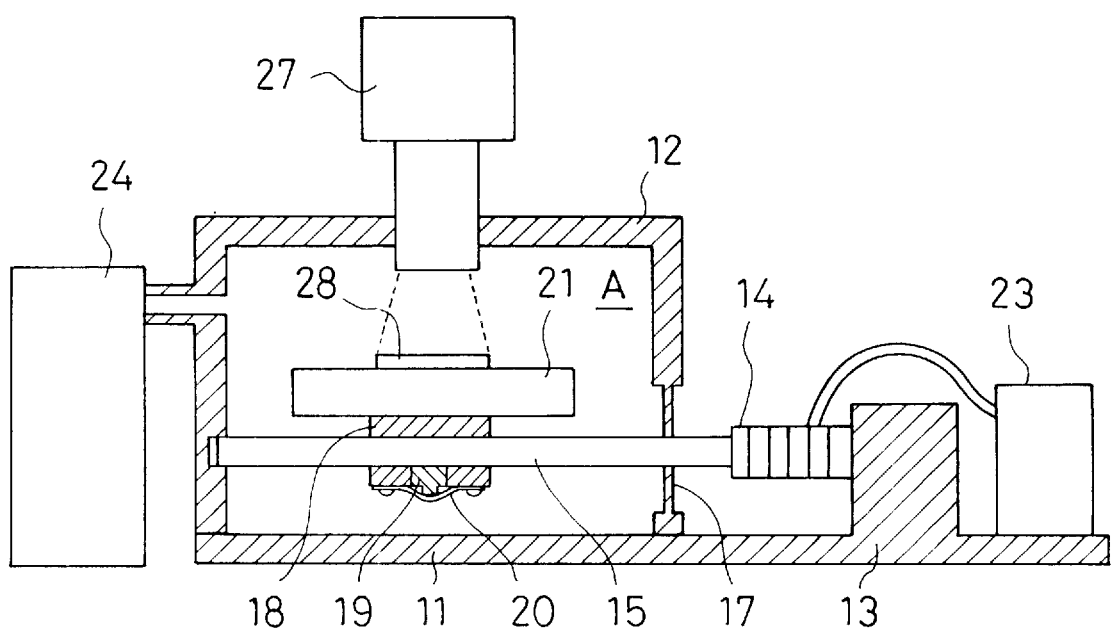
FIG. 5 is a sectional view showing essential portions of a semiconductor printing apparatus according to a second embodiment of the present invention.

FIG. 5 is a sectional view of a circuit pattern printing apparatus for printing a circuit pattern on a semiconductor wafer according to a second embodiment of the present invention. In FIG. 5, numeral 24 designates a vacuum pump, numeral 27 designates a printing device and numeral 28 designates a semiconductor wafer. The other portions the same as the constituent portions illustrated by FIG. 2 through FIG. 3, are attached with the same notations and an explanation thereof will be omitted.

Figure 6:
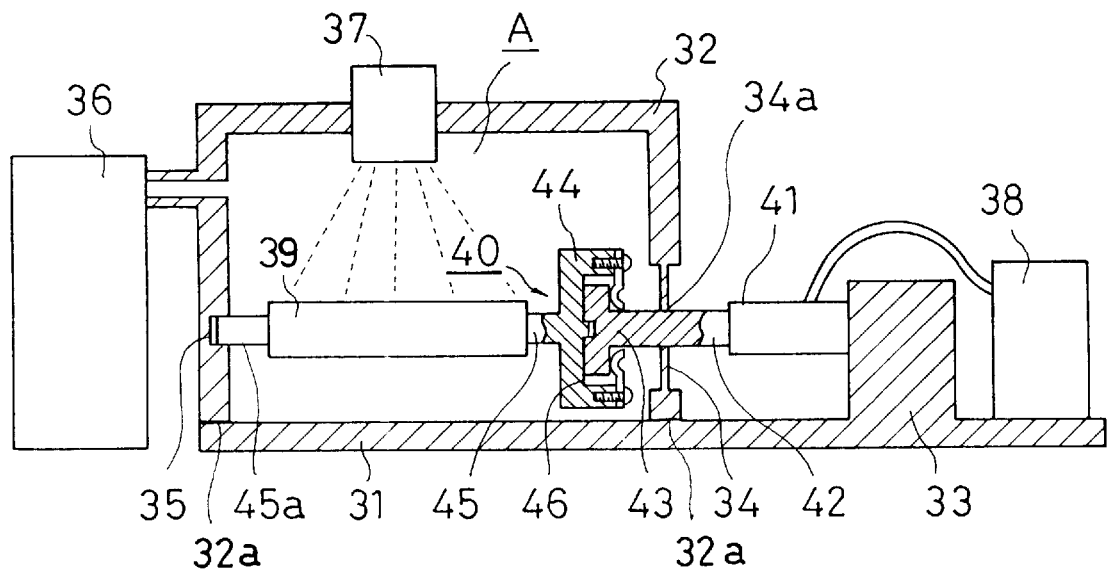
FIG. 6 is a sectional view showing essential portions of a vacuum deposition apparatus according to a third embodiment of the present invention.
Figure 7:
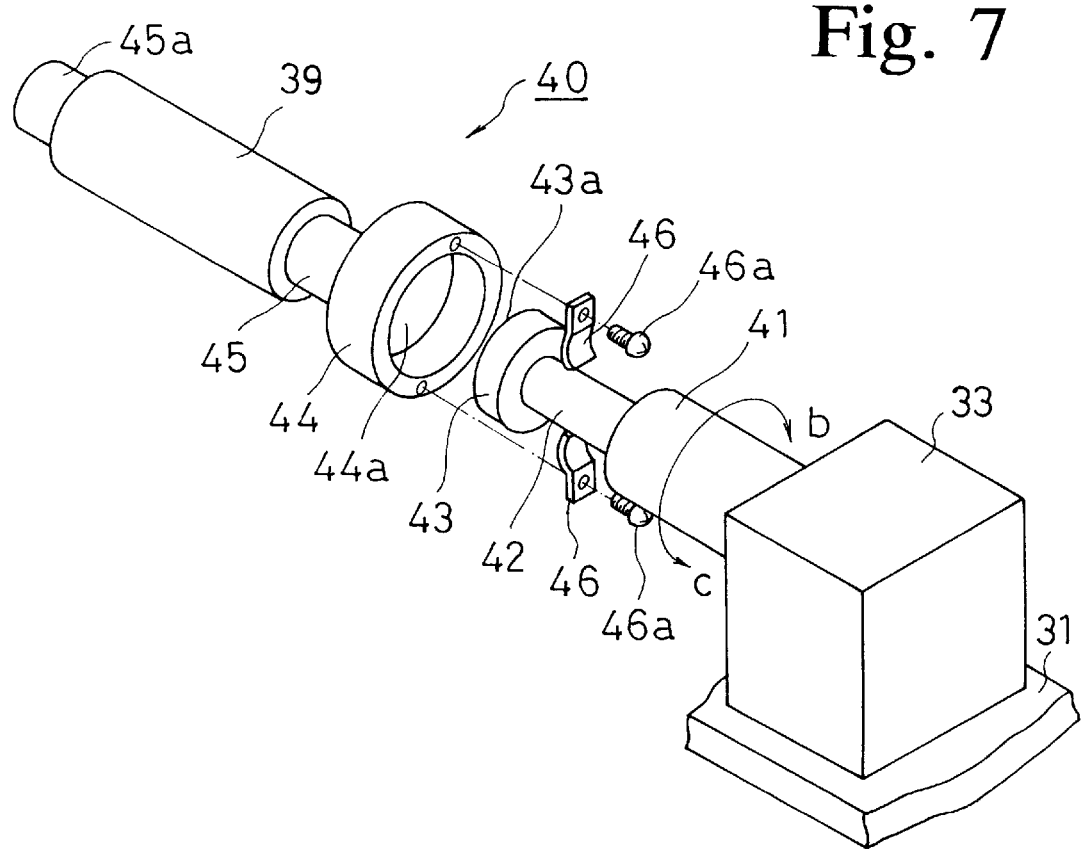
FIG. 7 is an exploded perspective view showing the constitution of a drive mechanism used in the third embodiment.
Figure 8:
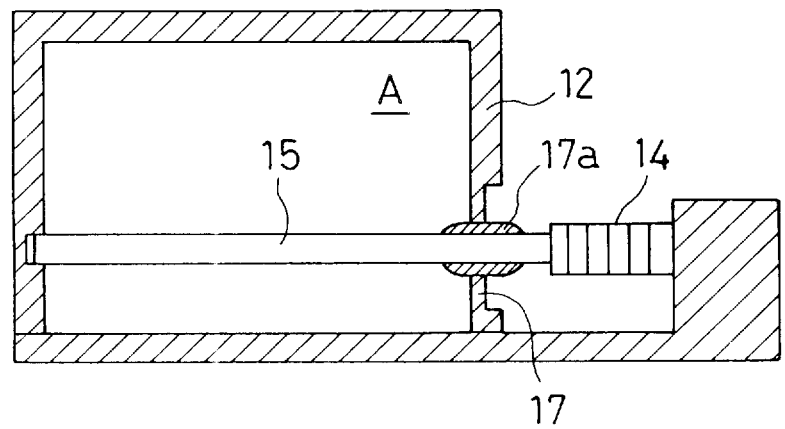
FIG. 8 is a sectional view showing a first modified example of a drive shaft penetrating portion of a hermetically-sealed vessel.
Figure 9:
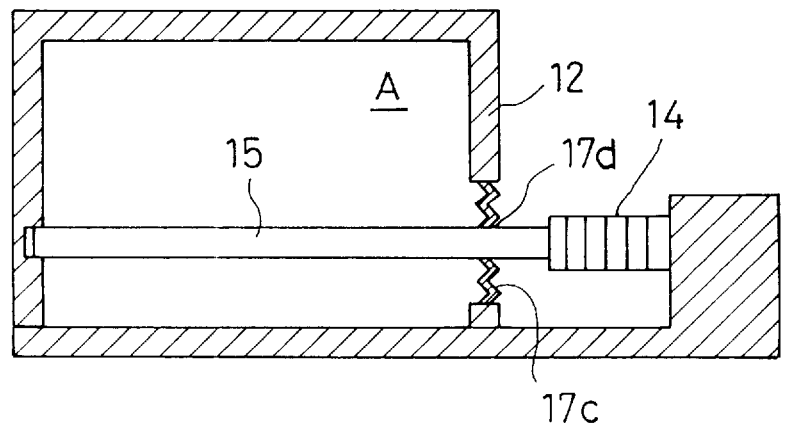
FIG. 9 is a sectional view showing a second modified example of a drive shaft penetrating portion of a hermetically-sealed vessel.
Figure 10:
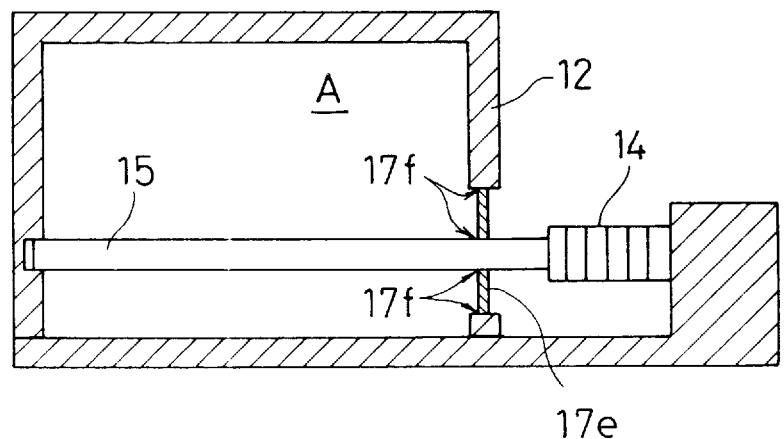
FIG. 10 is a sectional view showing a third modified example of a drive shaft penetrating portion of a hermetically-sealed vessel.

FIG. 6 is a sectional view showing a third embodiment of the present invention where a rotary drive device using a torsion type piezoelectric element to be explained in reference to FIG. 7, is applied to a vacuum deposition apparatus.

In FIG. 6, a box 32 is arranged on a frame 31 and the frame 31 and the box 32 are tightly connected by a suitable means such as adhesion or the like at portions 32a thereof whereby a hermetically-sealed vessel A is formed.

A supporting member 33 is formed on the frame 31 and a rotary drive device 40 using a torsion type piezoelectric element having the constitution shown by FIG. 7, is arranged between the supporting member 33 and a bearing 35 formed at a portion of the box 32. A drive shaft 42 of the rotary drive device 40 penetrates a thin wall portion 34 formed at a portion of the box 32. The thin wall portion 34 where the drive shaft 42 penetrates, is an elastically deformable circular thin wall portion centering on the portion thereof where the drive shaft 42 penetrates. The drive shaft 42 and the thin wall portion 34 is fixedly adhered with each other at a portion 34a thereof by an adhesive agent in order to maintain the airtightness.

A sample cylinder 39 that is driven to rotate by the rotary drive device 40 is arranged inside of the permetically-sealed vessel A and a vapor deposition device 37 is arranged thereabove. Numeral 36 designates a vacuum pump for maintaining in vacuum the inside of the hermetically-sealed vessel A and numeral 38 designates a drive power source for generating the drive pulses for driving the piezoelectric element.

Under such a construction, when the inside of the hermetically-sealed vessel A is maintained at a predetermined vacuum pressure by the vacuum pump 36, the sample cylinder 39 is rotated by operating the rotary drive device 40 and the vapor deposition device 37 is operated after charging a desired vapor deposition material, a desired vapor deposition material film can be formed by vapor deposition on the sample cylinder 39. In this case, the inside of the hermetically-sealed vessel A creates an environment under high temperatures necessary for the vapor deposition.

FIG. 7 is an exploded perspective view showing the constitution of the rotary drive device 40 used in the third embodiment. In FIG. 7, one end of a torsion type piezoelectric element 41 is fixedly adhered to the supporting member 33 on the frame 31 and one end of the drive shaft 42 is fixedly adhered to the other end of the piezoelectric element 41. A disk-like member 43 is integrally formed to the other end portion of the drive shaft 42. Meanwhile, a bottomed cylindrical member 44 is integrally formed to a driven shaft 45 for holding the sample cylinder 39 on its outer side face and the disk-like member 43 is fitted to engage with the bottomed cylindrical member 44.

Flat springs 46 are fixed to the outer peripheral portion of an end face of the cylindrical portion of the cylindrical member 44 by screws 46a, the flat springs 46 urge the disk-like member 43 toward the cylindrical member 44 in the axial direction whereby an end face 43a of the disk-like member 43 and a bottom face 44a of the cylindrical portion of the cylindrical member 44 are frictionally coupled by a pertinent frictional force. The urging force of the flat springs 46 can be adjusted by adjusting the amount of turning of the screws 46a whereby the frictional coupling force between the disk-like member 43 and the cylindrical member 44 can be adjusted. The other end portion (opposed to the cylindrical member 44) 45a of the driven shaft 45 is fitted to a bearing 35 formed at the inside of the box 32 as shown by FIG. 6 whereby the driven shaft 45 is rotatably supported.

Next, an explanation will be given of the operation. Firstly, when the sawtooth wave drive pulses each having a gradual rising portion and a steep falling portion as illustrated by FIG. 4 are applied on the piezoelectric element 41, the piezoelectric element 41 is displaced to twist gradually in an arrow mark "b" direction at the gradually rising portion of each of the drive pulses and also the disk-like member 43 coupled thereto via the drive shaft 42 is displaced to twist gradually in the arrow mark "b" direction. At this moment, the cylindrical member 44 frictionally coupled with the disk-like member 43 is displaced in the arrow mark "b" direction along with the disk-like member 43 by the frictional coupling force.

The piezoelectric element 41 is rapidly displaced to twist in an arrow mark "c" direction (a direction opposed to the arrow mark "b") at the steep falling portion of each of the drive pulses and the disk-like member 43 coupled thereto via the drive shaft 42 is also displaced to twist rapidly in the arrow mark "c" direction (a direction opposed to the arrow mark "b"). At this moment, the cylindrical member 44 frictionally coupled with the disk-like member 43 stays substantially at the position by surpassing the frictional coupling force by the inertia thereof and the torsional displacement is not caused. The cylindrical member 44 can be rotated continuously in the arrow mark "b" direction by continuously applying the drive pulses on the piezoelectric element 41.

Incidentally, according to the expression "substantially" mentioned here, there is included a movement where the cylindrical member 44 follows the disk-like member 43 while slipping at the frictionally coupled faces 43a and 44a between the disk-like member 43 and the cylindrical member 44 in any of the arrow mark "b" direction and the arrow mark "c" direction (a direction opposed to the arrow mark "b") and the cylindrical member 44 is rotated in the arrow mark "b" direction as a whole by a difference in drive time periods.

The rotational movement of the cylindrical member 43 in the arrow mark "c" direction (a direction opposed to the arrow mark "b") can be achieved by changing the waveform of the sawtooth wave drive pulses applied on the piezoelectric element 41 and applying the drive pulses each comprising a steep rising portion and a gradual falling portion.

FIG. 8 through FIG. 11 show modified examples of airtight structures in respect of the thin wall portion 17 of the box 12 constituting the hermetically-sealed vessel A and the drive shaft 15 penetrating the thin wall portion 17. According to FIG. 8, the thin wall portion 17 and the drive shaft 15 are fixedly adhered to each other by an adhesive agent 17a. According to FIG. 9, the thin wall portion is constituted by a bellows structure 17c to increase the amount of deformation of the thin wall portion where the thin wall structure 17c of the thin wall portion and the drive shaft 15 are fixedly adhered to each other by an adhesive agent 17d. According to FIG. 10, the thin wall portion is constituted by a metal plate 17e and the metal plate 17e of the thin wall portion, the box 12 and the drive shaft 15 are fixedly welded at portions 17f thereof.

Figure 11:
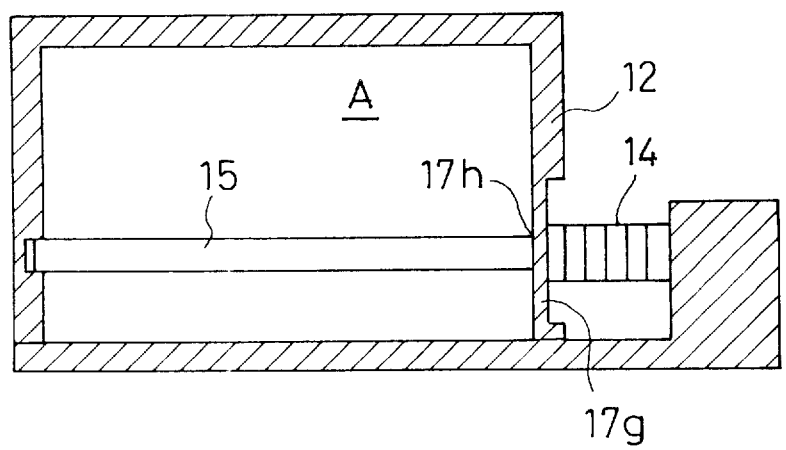
FIG. 11 is a sectional view showing a modified example where a hermetically-sealed vessel is not penetrated by the drive shaft.

Further, according to FIG. 11, the airtight structure is provided with a structure where the drive shaft 15 does not penetrate the thin wall portion of the box 12, the drive shaft 15 in the hermetically-sealed vessel A is arranged at a position opposed to an end portion of the piezoelectric element 14 via an elastically deformable thin wall portion 17g and the drive shaft 15 and the thin wall portion 17g are fixedly adhered to each other by an adhesive agent at a portion 17h thereof. The displacement in the thickness direction of the piezoelectric element 14, which is made to fixedly adhere to an outer surface of thin wall portion 17 g, can be transmitted to the drive shaft 15 also in this structure through the elastic deformation of the thin wall portion 17g. The modified examples shown in FIG. 8 through FIG. 11 are applicable to the respective embodiments shown by FIG. 1, FIG. 5, and FIG. 6.

Figure 12:
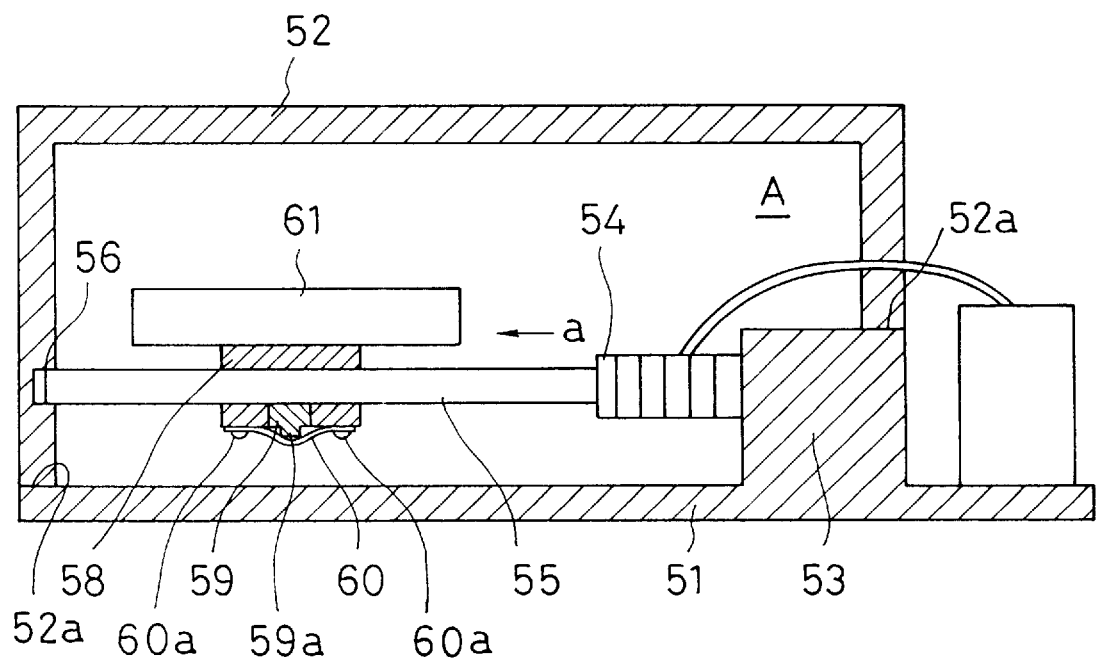
FIG. 12 is a sectional view showing the constitution of a drive device where a piezoelectric element is included inside of a hermetically-sealed vessel according to a fourth embodiment of the present invention.
Figure 15:
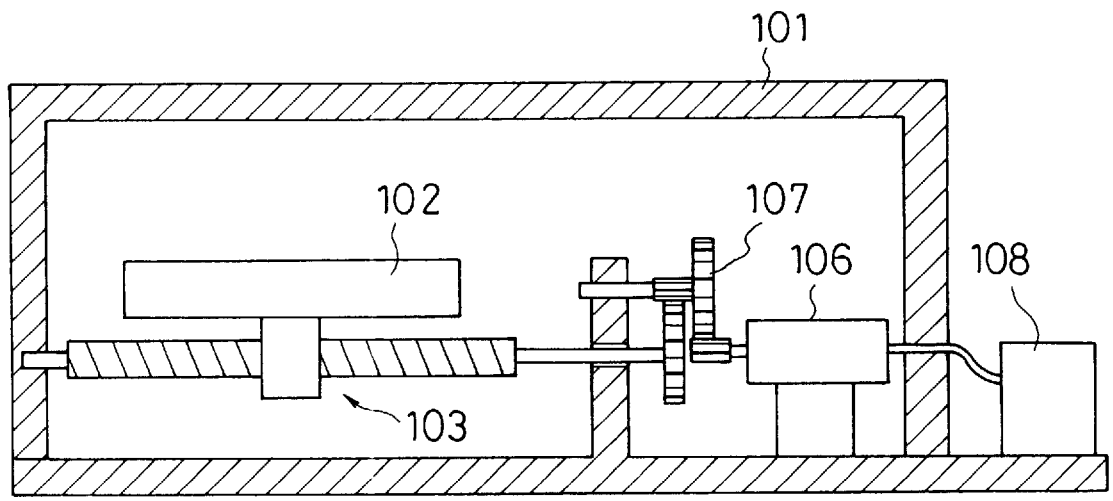
FIG. 15 is a sectional view showing a third conventional example of a sample stage drive device.

FIG. 12 is a sectional view showing a fourth embodiment of the present invention where a drive device using a piezoelectric element is installed at the inside of the hermetically-sealed vessel A.

A box 52 is arranged on a frame 51 and the frame 51 and the box 52 are closely connected by a suitable means of adhesion or the like at portions 52a whereby a hermetically-sealed vessel A is formed. A supporting member 53 is formed at the inside of the hermetically-sealed vessel A and one end portion of a piezoelectric element 54 is fixedly adhered to a side face of the supporting member 53. Numeral 55 designates a drive shaft one end of which is fixedly adhered to the other end portion of the piezoelectric element 54 and the other end of which is fitted to and supported by a bearing 56 formed at the inside of the box 52. The bearing 56 permits the displacement in the axial direction of the drive shaft 55 similar to that in the first embodiment.

The drive shaft 55 penetrates a slider block 58 holding a sample stage 61 in the horizontal direction and an opening portion 58a is formed at the lower portion thereof where the drive shaft 55 penetrates whereby the lower half of the drive shaft 55 is exposed. A pad 59 is inserted into the opening portion 58a whereby the pad 59 is brought into contact with the lower half of the drive shaft 55. A projection 59a is provided at the lower portion of the pad 59 and the projection 59a of the pad 59 is pressed up by a flat spring 60 whereby an upward urging force F is applied on the pad 59 that is brought into contact with the drive shaft 55. Notation 60a designates screws for fixing the flat spring 60 to the slider block 58 and the urging force F can be adjusted by adjusting the amount of turning of the screws 60a. The constitution of this portion is the same as that in the first embodiment illustrated by FIG. 3.

The operation of this constitution is the same as that in the first embodiment illustrated by FIG. 1 through FIG. 3. That is, firstly, when sawtooth wave drive pulses each having a gradual rising portion and a steep falling portion as shown by FIG. 4 are continuously applied on the piezoelectric element 54, a gradual elongation displacement and a steep contraction displacement are caused continuously in the piezoelectric element 54 and the drive shaft 55 coupled to the piezoelectric element 54. The reciprocal displacements having different velocities in the axial direction that is caused in the drive shaft 55 can make the slider block 58 frictionally coupled with the drive shaft 55 and the sample stage 61 move substantially in an arrow mark "a" direction.

According to the fourth embodiment, the drive shaft does not penetrate the hermetically-sealed vessel as in the constitutions shown by FIG. 1, FIG. 5 and FIG. 6 and no influence of vibration at the elastically deformed thin wall portion that is generated at a portion thereof where the drive shaft penetrates, is not received and accordingly, the reliability in respect of the degree of sealing of the hermetically-sealed vessel is promoted. Also, no special structure such as formation of the thin wall portion at a portion thereof where the drive shaft penetrates the hermetically-sealed vessel, is needed and therefore, the structure can be manufactured at a lower cost than the structures shown by FIG. 1, FIG. 5 and FIG. 6.

According to this constitution, volatile substances such as a lubricant is not used in the drive portion and therefore, it is especially suitable for driving a sample stage used under vacuum environment or the like. According to the constitution the piezoelectric element is arranged at the inside of the hermetically-sealed vessel and therefore, it is preferable that the environment of the inside of the hermetically-sealed vessel does not deteriorate the piezoelectric element.

As has been explained in details as described above, according to the drive devices using the electromechanical transducers of the present invention or the apparatuses to which the drive devices are applied, the moving members for moving the sample stages and the like are arranged in the environments shielded from outside and accordingly, even under special environments, for example, an environment where the pressure is reduced as in vacuum, an environment under high temperatures, an environment where electromagnetic waves influencing on an electron beam or the like are shielded, and the like, optimum environments in accordance with states of use can be prepared with no adverse influence on the elecromechanical transducers or the drive mechanisms.

What is claimed is:

1. An apparatus having a drive device using an electromechanical transducer, said apparatus comprising:
    a base frame;
    an electromechanical transducers one end of which is fixed to the base frame;
    a driving member, one end of which is fixed to said electromechanical transducer and which is supported movably in a direction of a displacement caused in the electromechanical transducer;
    a moving member frictionally coupled with said driving member; and
    a driver for driving said electromechanical transducer to cause reciprocal displacements having different velocities,
    wherein the driving member is reciprocally displaced based on the reciprocal displacements having the different velocities caused in said electromechanical transducer whereby the moving member frictionally coupled with the driving member is moved in a predetermined direction, and
    wherein at least said moving member is arranged in a shielded environment and said shielded environment is separated from an outside at a reciprocal displacing part of said drive member.

2. An apparatus having a drive device using an electromechanical transducer according to claim 1,
    wherein the shielded environment is an environment under a reduced pressure.

3. An apparatus having a drive device using an electromechanical transducer according to claim 1,
    wherein the shielded environment is an environment under high temperatures.

4. The apparatus having a drive device using an electromechanical transducer according to claim 1,
    wherein the shielded environment is an environment where electromagnetic waves influencing on an electron beam or the like are shielded.

5. An apparatus having a drive device using an electromechanical transducer, said apparatus comprising:
    a base frame;
    an electromechanical transducer one end of which is fixed to the base frame;
    a driving member, one end of which is fixed to said electromechanical transducer and which is supported movably in a direction of a displacement caused in the electromechanical transducer;
    a moving member frictionally coupled with said driving member;
    a driver for driving said electromechanical transducer to cause reciprocal displacements having different velocities,
    wherein the driving member is reciprocally displaced based on the reciprocal displacements having the different velocities caused in said electromechanical transducer whereby the moving member frictionally coupled with the driving member is moved in a predetermined direction; and
    a hermetically-sealed vessel where at least said moving member is arranged,
    wherein the moving member arranged in an inner portion of the hermetically-sealed vessel is driven in the predetermined direction via the electromechanical transducer arranged at an outer portion of said hermetically-sealed vessel, and
    wherein the driving member is extended to an inner portion of the hermetically-sealed vessel by penetrating the hermetically-sealed vessel.

6. An apparatus having a drive device using an electromechanical transducer, said apparatus comprising:
    a base frame;
    an electromechanical transducer one end of which is fixed to the base frame;
    a driving member movable in a direction of a displacement of the electromechanical transducer when the displacement caused in said electromechanical transducer is transmitted to the driving member;
    a moving member frictionally coupled with said driving member;
    a driver for driving said electromechanical transducer to cause reciprocal displacements having different velocities,
    wherein the driving member is reciprocally displaced based on the reciprocal displacements having the different velocities caused in said electromechanical transducer whereby the moving member frictionally coupled with the driving member is moved in a predetermined direction; and
    a hermetically-sealed vessel in which at least said moving member and a portion of said driving member are arranged; and a displacement transmission member provided at a wall face of the hermetically-sealed vessel for transmitting the reciprocal displacements caused by the reciprocal movement of the electromechanical transducer arranged at an outer portion of said hermetically-sealed vessel to the driving member at an inner portion of the hermetically-sealed vessel, wherein said driving member drives the moving member at the inner portion of the hermetically-sealed vessel in the predetermined direction based on the reciprocal displacements of the electromechanical transducer transmitted to the driving member at the inner portion of the hermetically-sealed vessel via the displacement transmission member.

7. An apparatus having a drive device using an electromechanical transducer, said apparatus comprising:

a base frame;

an electromechanical transducer, one end of which is fixed to the base frame;

a driving member, one end of which is fixed to said electromechanical transducer and which is supported movably in a direction of a displacement caused in the electromechanical transducer;

a moving member frictionally coupled with said driving member; and a driver for driving said electromechanical transducer to cause reciprocal displacements having different velocities, wherein the driving member is reciprocally displaced based on the reciprocal displacements having the different velocities caused in said electromechanical transducer whereby the moving member frictionally coupled with the driving member is moved linearly in a predetermined direction, and wherein said electromechanical transducer, said driving member and said moving member are arranged in a shielded environment.

8. An apparatus comprising:

an electromechanical transducer;

a driving member reciprocally driven by a displacement of said electromechanical transducer;

a moving member frictionally coupled with said driving member and moved by the reciprocal driving of the driving member; and, a shield structure for shielding said moving member from an outside, wherein said electromechanical transducer is placed on outside of said shield structure and the moving manner of said moving member is different from the moving manner of said electromechanical transducer.

9. An apparatus according to claim 8, wherein said driving member penetrates said shield structure, and wherein said shield structure permits the reciprocal driving of said driving member by an elasticity thereof at a portion of the shield structure penetrated by the driving member.

10. An apparatus according to claim 8, wherein an inner portion of said shield structure is under a reduced pressure.

11. An apparatus according to claim 8, wherein an inner portion of said shield structure is under high temperature.

12. An apparatus according to claim 8, wherein an inner portion of said shield structure is shielded against electromagnetic waves.

13. An apparatus comprising:

an electromechanical transducer elongated and contracted by applying a voltage;

a moving member driven by expanding and contracting said electromechanical transducer; and a shield structure for shielding said electromechanical transducer and the moving member, wherein said moving member frictionally coupled with the driving member is moved linearly in a predetermined direction.

14. An apparatus according to claim 13, wherein an inner portion of said shield structure is under a reduced pressure.

* * * * *

UNITED STATES PATENT AND TRADEMARK OFFICE
CERTIFICATE OF CORRECTION

PATENT NO. : 5,847,488
DATED : December 8, 1998
INVENTOR(S) : Ryuichi YOSHIDA et al.

It is certified that error appears in the above-identified patent and that said Letters Patent is hereby corrected as shown below:

<u>Col. 9</u>,
    line 46, change "transducers" to --transducer,--.

Signed and Sealed this

Twenty-fifth Day of May, 1999

Attest:

Q. TODD DICKINSON

*Attesting Officer*      *Acting Commissioner of Patents and Trademarks*